United States Patent [19]

Almond et al.

[11] Patent Number: 4,979,169

[45] Date of Patent: Dec. 18, 1990

[54] METHOD AND APPARATUS FOR PERFORMING FORMAT CONVERSION BETWEEN BIT STREAMS

[75] Inventors: Gary R. Almond, Frederick, Md.; Daniel A. Nobile, Alexandria, Va.

[73] Assignee: Data General Corporation, Westboro, Mass.

[21] Appl. No.: 310,454

[22] Filed: Feb. 14, 1989

[51] Int. Cl.$^5$ .............................. H04J 3/02; H04J 3/06
[52] U.S. Cl. ........................................ 370/99; 370/79; 370/105.1
[58] Field of Search ................... 370/99, 84, 79, 82, 370/85.1, 100.1, 105.1

[56] References Cited

U.S. PATENT DOCUMENTS

| | | | |
|---|---|---|---|
| 4,276,641 | 6/1981 | Nguyen et al. | 370/99 |
| 4,330,856 | 5/1982 | Takasaki et al. | 370/102 |
| 4,545,052 | 10/1985 | Steierman | 370/99 |
| 4,595,907 | 6/1986 | Huffman et al. | 370/99 |

Primary Examiner—Douglas W. Olms
Assistant Examiner—Min Jung
Attorney, Agent, or Firm—Joseph J. Kaliko; Joel Wall

[57] ABSTRACT

Methods and apparatus are set forth that perform Format Conversion between bit streams which embed sub-rate circuit data according to different protocols. The invention (1) locates and extracts the sub-rate circuit data embedded, in an input serial bit stream, in accordance with a first predefined protocol (2) aligns the data in a buffer, and (3) creates an output bit stream in which the extracted circuit data is reformatted and inserted in accordance with a second predefined protocol. A programmable bit map driven format conversion module operates the data aligned in the aforementioned buffer. The conversion process is bidirectional and, in one embodiment of the invention, facilitates conversion between a single stage time division multiplexed data format and a two stage time division multiplexed format (e.g. X.50 and I.463) by utilizing the aforesaid bit map driven format conversion technique. More generally, the invention permits conversion between any two predefined protocols, permits great flexibility in network system configuration and permits multiple channels of different format or frame alignments to be converted simultaneously.

14 Claims, 10 Drawing Sheets

○ = NODE

| FRAME | | | | | | | | | | | | | | | | | | | |
|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 |
| A | 1 | 1 | 0 | 1 | 0 | 0 | 1 | 0 | 0 | 0 | 0 | 1 | 0 | 1 | 0 | 1 | 1 | 1 | 0 |

WHERE: A = ALARM BIT (0 = ALARM, 1 = NO ALARM)

(80 BIT FRAME SEQUENCE / 8 kbps CHANNEL)

(ASSUMES ALL 8 kbps CHANNELS)

| OCTET # | BITS | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

WHERE:
S, X = OVERHEAD CHANNEL BITS
E = CIRCUIT RATE INFORMATION (ie., 2.4, 4.8, kbps, ETC.)
D = CIRCUIT DATA (48 BITS)
0, 1 = FRAMING BITS

FIG. 14

| CKT # | TDM DATA (2.4 kbps) ALIGNED DATA RAM | | | | | | | | FRAME # | ISDN DATA (2.4 kbps) OUTGOING DATA — CKT # | | | | | | | |
|---|---|---|---|---|---|---|---|---|---|---|---|---|---|---|---|---|---|
| | | | | | | | | | | 1 | 2 | 3 | 4 | 5 | 6 | 7 | 8 |
| 1 | A | D1 | D2 | D3 | D4 | D5 | D6 | S | 0 | 0 | 0 | 0 | 0 | 0 | 0 | 0 | 0 |
| 2 | 1 | D1 | D2 | D3 | D4 | D5 | D6 | S | 1 | 0 | 0 | 0 | 0 | 0 | 0 | 0 | 0 |
| 3 | 1 | D1 | D2 | D3 | D4 | D5 | D6 | S | 2 | 0 | 0 | 0 | 0 | 0 | 0 | 0 | 0 |
| 4 | 0 | D1 | D2 | D3 | D4 | D5 | D6 | S | 3 | 0 | 0 | 0 | 0 | 0 | 0 | 0 | 0 |
| 5 | 1 | D1 | D2 | D3 | D4 | D5 | D6 | S | 4 | 0 | 0 | 0 | 0 | 0 | 0 | 0 | 0 |
| 6 | 0 | D1 | D2 | D3 | D4 | D5 | D6 | S | 5 | 0 | 0 | 0 | 0 | 0 | 0 | 0 | 0 |
| 7 | 0 | D1 | D2 | D3 | D4 | D5 | D6 | S | 6 | 0 | 0 | 0 | 0 | 0 | 0 | 0 | 0 |
| 8 | 1 | D1 | D2 | D3 | D4 | D5 | D6 | S | 7 | 0 | 0 | 0 | 0 | 0 | 0 | 0 | 0 |
| 9 | 0 | D1 | D2 | D3 | D4 | D5 | D6 | S | 8 | 1 | 1 | 1 | 1 | 1 | 1 | 1 | 1 |
| 10 | 0 | D1 | D2 | D3 | D4 | D5 | D6 | S | 9 | D1 | D1 | D1 | D1 | D1 | D1 | D1 | D1 |
| 11 | 0 | D1 | D2 | D3 | D4 | D5 | D6 | S | 10 | D1 | D1 | D1 | D1 | D1 | D1 | D1 | D1 |
| 12 | 1 | D1 | D2 | D3 | D4 | D5 | D6 | S | 11 | D2 | D2 | D2 | D2 | D2 | D2 | D2 | D2 |
| 13 | 1 | D1 | D2 | D3 | D4 | D5 | D6 | S | 12 | D2 | D2 | D2 | D2 | D2 | D2 | D2 | D2 |
| 14 | 0 | D1 | D2 | D3 | D4 | D5 | D6 | S | 13 | D3 | D3 | D3 | D3 | D3 | D3 | D3 | D3 |
| 15 | 1 | D1 | D2 | D3 | D4 | D5 | D6 | S | 14 | D3 | D3 | D3 | D3 | D3 | D3 | D3 | D3 |
| 16 | 0 | D1 | D2 | D3 | D4 | D5 | D6 | S | 15 | S | S | S | S | S | S | S | S |
| 17 | 1 | D1 | D2 | D3 | D4 | D5 | D6 | S | 16 | 1 | 1 | 1 | 1 | 1 | 1 | 1 | 1 |
| 18 | 1 | D1 | D2 | D3 | D4 | D5 | D6 | S | 17 | D4 | D4 | D4 | D4 | D4 | D4 | D4 | D4 |
| 19 | 1 | D1 | D2 | D3 | D4 | D5 | D6 | S | 18 | D4 | D4 | D4 | D4 | D4 | D4 | D4 | D4 |
| 20 | 0 | D1 | D2 | D3 | D4 | D5 | D6 | S | 19 | D5 | D5 | D5 | D5 | D5 | D5 | D5 | D5 |
| BIT # | 0 | 1 | 2 | 3 | 4 | 5 | 6 | 7 | BIT # | 0 | 1 | 2 | 3 | 4 | 5 | 6 | 7 |

TD FORMAT – FIRST 20 FRAMES

ISDN FORMAT – FIRST 20 FRAMES (2.4 kbps SUBRATE CONVERSION TEMPLATE)

| ALIGNED DATA RAM ADDRESS | TDM CIRCUIT DATA | IML POSITION FRAME # | CHANNEL # |
|---|---|---|---|
| 00 | CIRCUIT 1 | 0 | 1 |
| 01 | CIRCUIT 2 | 1 | |
| 02 | CIRCUIT 3 | 2 | |
| / / | / | / | / |
| 12 | CIRCUIT 19 | 18 | |
| 13 | CIRCUIT 20 | 19 | |
| 14-1F | NO DATA | — | |
| 20 | CIRCUIT 1 | 0 | 2 |
| 21 | CIRCUIT 2 | 1 | |
| 22 | CIRCUIT 3 | 2 | |
| / / | / | / | / |
| 32 | CIRCUIT 19 | 18 | |
| 33 | CIRCUIT 20 | 19 | |
| 34-3F | NO DATA | — | |
| 40 | CIRCUIT 1 | 0 | 3 |
| 41 | CIRCUIT 2 | 1 | |
| // // // // | // // // | // // | // // // |
| 3F2 | CIRCUIT 19 | 18 | 31 |
| 3F3 | CIRCUIT 20 | 19 | |
| 3F4-3FF | NO DATA | — | |

RAM ADDRESS = CHANNEL # A9 A8 A7 A6 A5    FRAME # A4 A3 A2 A1 A0

METHOD AND APPARATUS FOR PERFORMING FORMAT CONVERSION BETWEEN BIT STREAMS

BACKGROUND OF THE INVENTION

1. Field of the Invention

The invention generally pertains to digital data communication systems. More particularly, the invention relates to methods and apparatus which use bit mapping and frame alignment techniques to (1) locate and extract sub-rate circuit data originially placed into a high speed serial bit stream in accordance with a first predefined sub-rate circuit protocol, and (2) create a reformatted high speed serial data output stream, with the extracted sub-rate circuit data inserted therein in accordance with a second predefined sub-rate circuit protocol. The methods and apparatus set forth are particularly useful in converting between a single stage time division multiplexed data format and a two stage time division multiplexed format, e.g., the CCITT X.50 and I.463 protocols.

2. Description of the Prior Art

State of the art digital data communication switching systems are typified by the systems described in copending patent application Ser. No. 07/103,611, filed Oct. 1, 1987, entitled "High Speed Communication Processing System", and Ser. No. 07/103,612, also filed Oct. 1, 1987, entitled "A Digital Data Communications System". Both of these applications, hereby incorporated by reference, are assigned to the same assignee as this invention.

The systems taught in these applications are defined as having m slots of data per frame and n fragments per slot to yield a total of m×n fragments per frame.

For example, the invention taught in the No. 07/103,612 application permits a T1 line to be divided up into 24 slots, each 64 Kbps wide, with 8 fragments being defined per slot (each representing 8 Kbps bandwidth). This yields 192 fragments with an 8 Kbps signalling channel left on the T1 line. Bandwidth allocation is also contemplated for 2.048 Mbps Inter Module Links ("IMLs") within a given node, where 32 slots, each 64 Kbps wide, can be defined (each again with eight 8 Kbps fragments).

Also taught in the referenced applications are means for allocating and deallocating bandwidth on the communication lines of the system using bit maps, how to perform allocation in a manner which minimizes call blocking, contention, etc., and how to interconnect Customer Premise Equipment (CPE) to the node oriented network via User Interfaces (UI), Network Processors (NPs), Switch Matrices (SMs), Network Interfaces (NIs), etc., via the IMLs in a given node.

The systems taught in the referenced applications support the CCITT I.463 standard for multiplexing of sub-rate channels. Also, these systems have the capability of switching fragment vs. slot packets, i.e., have an improved switching granularity as compared with the 64 Kbps switch granularity to which the I.463 standard was designed.

For the illustrative 32 slot, 8 fragments per slot IML bandwidth scheme set forth hereinbefore, I.463 mandates that sub-rate channels (defined herein as a 19.2 Kbps channel or any submultiple thereof) be assigned to 64 Kbps of bandwidth (a whole slot) before being transmitted to the switch. According to the I.463 standard, two layers of rate adaptation are performed to condition sub-rate channel data to be transmitted in the 64 Kbps packets.

Given the improved switching granularity and bandwidth allocation capabilities of state of the art systems, such as those set forth in the referenced copending patent applications, it was an object of copending patent application Ser. No. 07/308,705, filed on Feb. 9, 1989, entitled "Methods and Apparatus For Multiplexing Sub-rate Channels In A Digital Data Communication System", assigned to the same assignee as this invention, to improve the efficiency of bandwidth usage over the I.463 standard for sub-rate channel bandwidth allocation. This copending application is hereinafter referred to as the "Improved I.463 Patent Application".

It was also an object of the Improved I.463 Patent Application to be able to fully use the switching capabilities (granularity) of the communication system. Since the inventions taught in the incorporated patent applications made it possible to switch fragments of less then 64 Kbps, it was recognized that it would be desirable if sub-rate channel assignments were keyed to the granularity of the switch which in turn could be ideally matched to the choice of fragment size.

Patent application Ser. No. 07/308,705, filed Feb. 9, 1989, is hereby incorporated by reference.

In short, the Improved I.463 Patent Application, describes how to improve the efficiency of bandwidth usage over the CCITT I.463 standard, for switching systems having a granularity of better then 64 Kbps (e.g. 8 Kbps)

The efficiency of bandwidth usage over the I.463 standard is achieved (in the context of the illustrative example set out above) by implementing a new rate adaptation scheme in which sub-rate data channels are assigned to an 8 Kbps fragment, or multiples thereof. For example, a 2.4 Kbps channel is assigned to an 8 Kbps envelope, 9.6 Kbps is assigned to two 8 Kbps envelopes, etc. Multiple envelopes (each 8 Kbps wide) are then multiplexed effecting a potential 8 fold improvement over existing methods and apparatus for implementing the I.463 standard. In the illustrative context, the key is to use the 8 Kbps granularity of the switch rather then the I.463 standard of assigning sub-rate data to a whole 64 Kbps slot.

The CCITT I.463 standard (and/or improved versions thereof) are not in universal use in digital communication systems that carry sub-rate circuits. The Japanese for example, utilize the CCITT X.50 recommendations (to be reviewed in detail hereinafter) for formatting sub-rate circuit data. If wide area networks are to include nodes where different format criteria are observed, particularly regarding the placement of sub-rate data in their output bit streams, then methods and apparatus to support format conversion in such a network need to be devised to make communication between the users at these nodes possible.

SUMMARY OF THE INVENTION

Accordingly, it is an object of the invention to provide methods and apparatus that permit nodes of a communication network, in which different data formatting criteria for sub-rate circuit data are in force, to be able to communicate with one another.

It is a further object of the invention to provide methods and apparatus for accomplishing the aforesaid objective via frame alignment, buffering and bit map driven reformatting techniques.

It is still a further object of the invention to provide methods and apparatus that perform the aforesaid conversion (1) by locating and extracting sub-rate circuit data, embedded in an input serial bit stream in accordance with a first predefined protocol (used at the sending node), and (2) by creating an output bit stream, destined for use by the receiving (target) node, in which the extracted circuit data is reformatted and inserted in accordance with a second predefined protocol, (in use at the target node).

A further, more specific, object of the invention is to provide a format converter that performs bidirectional conversion between a single stage time division multiplexed data format and a two stage time division multiplexed data format (e.g. between nodes using the X.50 and I.463 recommendations).

A "stage" is defined hereinafter to mean a level of framing. Thus, "single stage" refers to one level of framing; while "two stage" refers to two levels of framing.

Those skilled in the art will readily appreciate that a single stage format (like I.463) implies that a defined t-bit frame repeats every frame. Data may change, but not the definition of what each bit in the frame structure means (e.g., source of data). With a two stage format (like X.50) each frame has a bit definition (like single stage); but over a multiframe, corresponding bits in each frame can have a different meaning (e.g., bit 1 in frame 1 and frame 3 could represent data from different sources). Only after a full multiframe will there be a repetition of bit definitions wherein two levels of framing are used.

To reiterate, I.463 is well known as a single stage sub-rate data multiplex scheme used with ISDN devices; while X.50 is a well known two stage sub-rate data multiplexing scheme used with TDM devices.

In accordance with the teachings of the invention, methods and apparatus are set forth which are operative to convert between a plurality of sub-rate data formats in the following manner.

First means are utilized to take sub-rate data, embedded in a serial IML stream, that is asynchronous with respect to the target node, and identify the start of received sub-rate circuit information in the stream. Since IML data is organized in terms of frames and channels, the start of each IML frame must be determined in order to locate the circuit data. The data is embedded in a discrete portion of a frame, in accordance with a first predefined sub-rate CCITT protocol (e.g., X.50).

Once the sub-rate circuit locations in the data stream are identified, the input sub-rate circuit information is aligned in memory means and operated on by a bit map driven Format Conversion Module ("FCM"). The FCM reassembles the sub-rate circuit information in accordance with the sub-rate circuit data format protocol used by the target node (e.g., I.463) and then transmits (outputs) the reformatted bit stream onto an outgoing IML.

According to the invention, the process is bidirectional.

Furthermore, according to one embodiment of the invention, the Format Convertor (FC) facilitates conversion between a single stage time division multiplexed data format and a two stage time division multiplexed format (e.g. X.50 and I.463) by utilizing the aforesaid bit map driven format conversion technique.

The invention permits great flexibility in network system configuration. In addition, the invention permits multiple channels of different format or frame alignments to be converted simultaneously.

These and other objects and feature of the present invention will be understood by those of ordinary skill in the art after referring to the detailed description of the preferred embodiment of the invention and the appended drawing.

BRIEF DESCRIPTION OF THE DRAWING

FIG. 14 depicts a portion of an exemplary bit map for converting TDM into ISDN subrate data.

DETAILED DESCRIPTION

Figure 1:
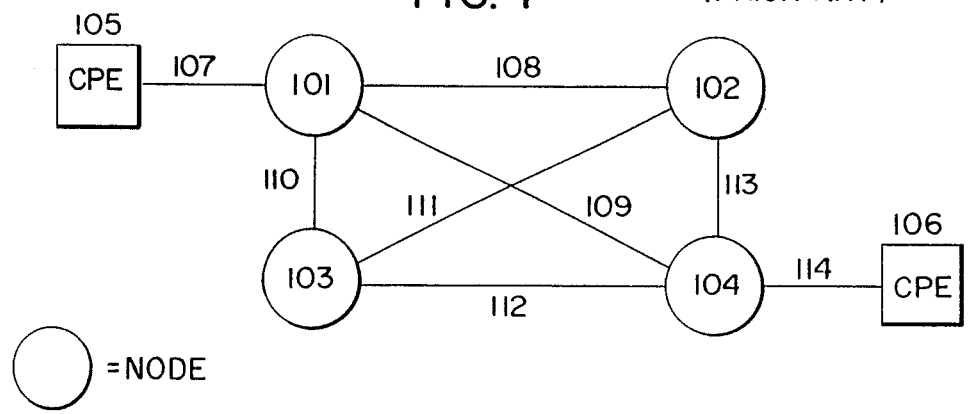
FIG. 1 is a high-level functional representation of a typical digital data communication network comprising nodes interconnected by communication lines.

FIG. 1 depicts a typical network consisting of nodes 101, 102, 103 and 104 interconnected by communication lines. Some of the nodes are shown as having CPE equipment connected to them. (Node 101 is shown connected to CPE 105, and node 104 is shown connected to CPE 106.) In practice, any of the nodes may have CPE connected to them.

As for the type of sub-rate circuit data formatting defined as standard at a given node, node 104 could, for example, be connected to user telephone equipment in Japan where X.50 formatting conventions are followed; while node 101 could be connected to user equipment in the U.S. where I.463 formatting conventions are followed.

Figure 2:
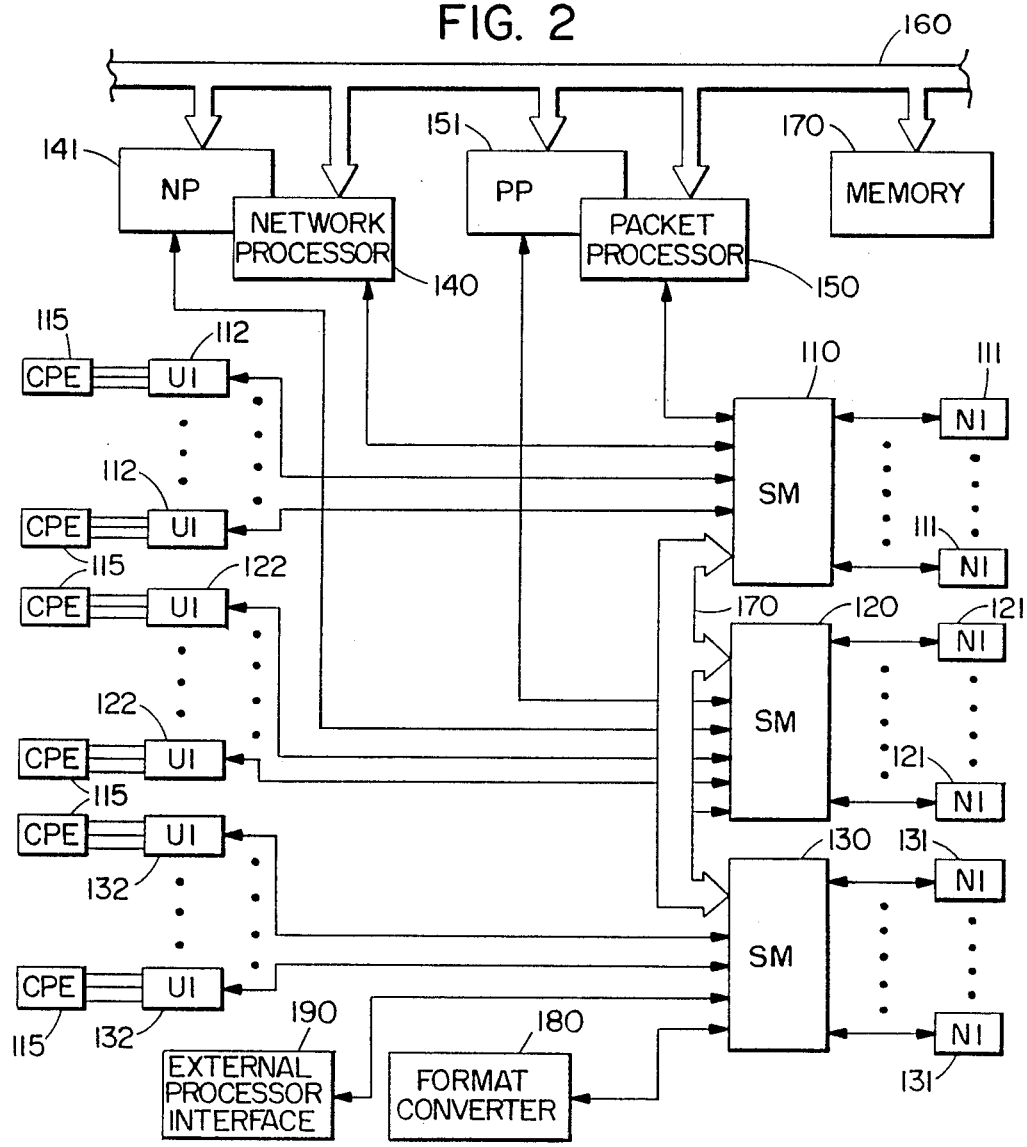
FIG. 2 is a block diagram of one such node showing a variety of communication paths both within and outside of a given node.

FIG. 2 depicts an example, in block diagram form, of one node in a communications network like the one depicted in FIG. 1.

For sake of illustration, three Switch Matrices 110, 120 and 130, for example wideband time-slot switches, are each shown connected, via bidirectional serial links, to a plurality of User Interfaces (UI) 112, 122 and 132 and a plurality of Network Interfaces (NI) 111, 121, 131. In addition, SM 110 is shown connected via a bidirectional serial link to Network Processor (NP) 140 and Packet Processor (PP) 150. SM 120 is connected via a similar data link to NP 141 and PP 151.

It should be understood that the disclosed system is highly flexible and modular and the depicted system was chosen for simplicity and clarity of presentation. It is but one example of many possible combinations of these components. A greater or lesser number of switch matrices, network processors, packet processors, user interfaces and network interfaces could have been chosen to depict the system. The specific design of an individual system depends on the particular data, voice and other requirements placed on the node. For example, a system handling a large amount of packet switching could require more packet processors, but fewer switch matrices Similarly, a system handling a large amount of circuit switching traffic could require a larger number of switching matrices, but only one packet processor.

Since the three switch matrices in the illustrative node, and their interconnections, are substantially identical, only SM 110 will be discussed in detail. SM 110, in a preferred embodiment, contains 16 I/O ports to accommodate up to 16 data links. Other numbers of I/O ports could have been chosen for the switch matrix. As discussed below, these 16 I/O ports may be individually connected to a user equipment interface, a network equipment interface, a packet processor, a network processor, another switch matrix or, if appropriate to the system, a special purpose format convertor (180) or an interface to an external processor (190). In this embodiment, all data links operate at 2.048 Mbps. It will be understood by those of ordinary skill in the art that different data rates could have been used.

User Interface 112 contains the logic to receive voice, data and fax information from various Customer Provided Equipment (CPE) 115 and perform the necessary formatting, multiplexing, buffering and switching functions to provide the user data to SM 110. Each UI 112 also contains the logic to receive data from SM 110 and perform the necessary formatting, demultiplexing, buffering and switching functions to provide the data to the appropriate user I/O device.

Each NI 111, for example a T1 interface, contains the logic to receive data from SM 110 and perform the necessary formatting, demultiplexing, buffering and switching to provide the data to the appropriate network (not shown). Each NI 111 also contains the logic to receive data from the network and perform the necessary formatting, multiplexing, buffering and switching functions to provide data from the network to SM 110. SM 120 and 130 are similarly connected to User Interfaces 113 and 114 respectively and to Network Interfaces 121 and 131 respectively.

In the disclosed embodiment, close physical proximity of the switch matrices allows for the use of a high bandwidth backplane bus 170 to handle communications among switch matrices This eliminates the need for dedicating a portion of the switch matrix I/O ports to communication among switch matrices and frees the ports for user traffic. The use of a high bandwidth bus also has the advantage of providing sufficient bandwidth to allow additional switch matrices, and therefore, additonal user and network interfaces, to be incorporated into the system. If desirable in a particular system, however, communications among switch matrices could be handled via data links.

The Network Processor provides the appropriate commands and information to establish and terminate the approporate Switch Matrix connections to accomplish the requested informaiton transfer. The Packet Processor operates as a "level 2" protocol translation processor and is responsible for creating, formatting and controlling the transfer of information according to the desired protocol standard. As discussed above, the switch matrices are connected via data links to the Network Processors and the Packet Processors.

To provide overall coordination of the interconnection of the system components, one of the network processors must function as a "master". This requires that the master must be informed of, and retain a record of, all switching connections established not only by itself, but also by the other network processors. As can be seen from FIG. 2, each of the network and packet processors needs to be directly connected via a data link to only one of the switch matrices. NP 140, in this emboidment, is connected via data link only to SM 110. Switching commands or other information from NP 140 to one of the other switch matrices is passed through SM 110 via bus 170 to SM 120 or SM 130.

In addition to being connected to the switch matrices by data links, each network and packet processor can communicate with each other processor via a standard parallel processor bus 160. Memory 161, for example, a hard disk, and other processing resources may be attached to bus 160 and accessed by the processors over bus 160.

The operation of the illustrative network and node briefly described hereinabove, is more fully described in the previously incorporated patent application Ser. No. 07/103,611. Also, the operation of such a network with an Improved I.463 sub-rate channel rate adaptation scheme, permitting up to three 2.4 Kbps sub-rate circuits to be embedded in an 8 Kbps envelope, is set forth in patent application, Ser. No. 07/308,705, previously incorporated by reference.

Figure 3:
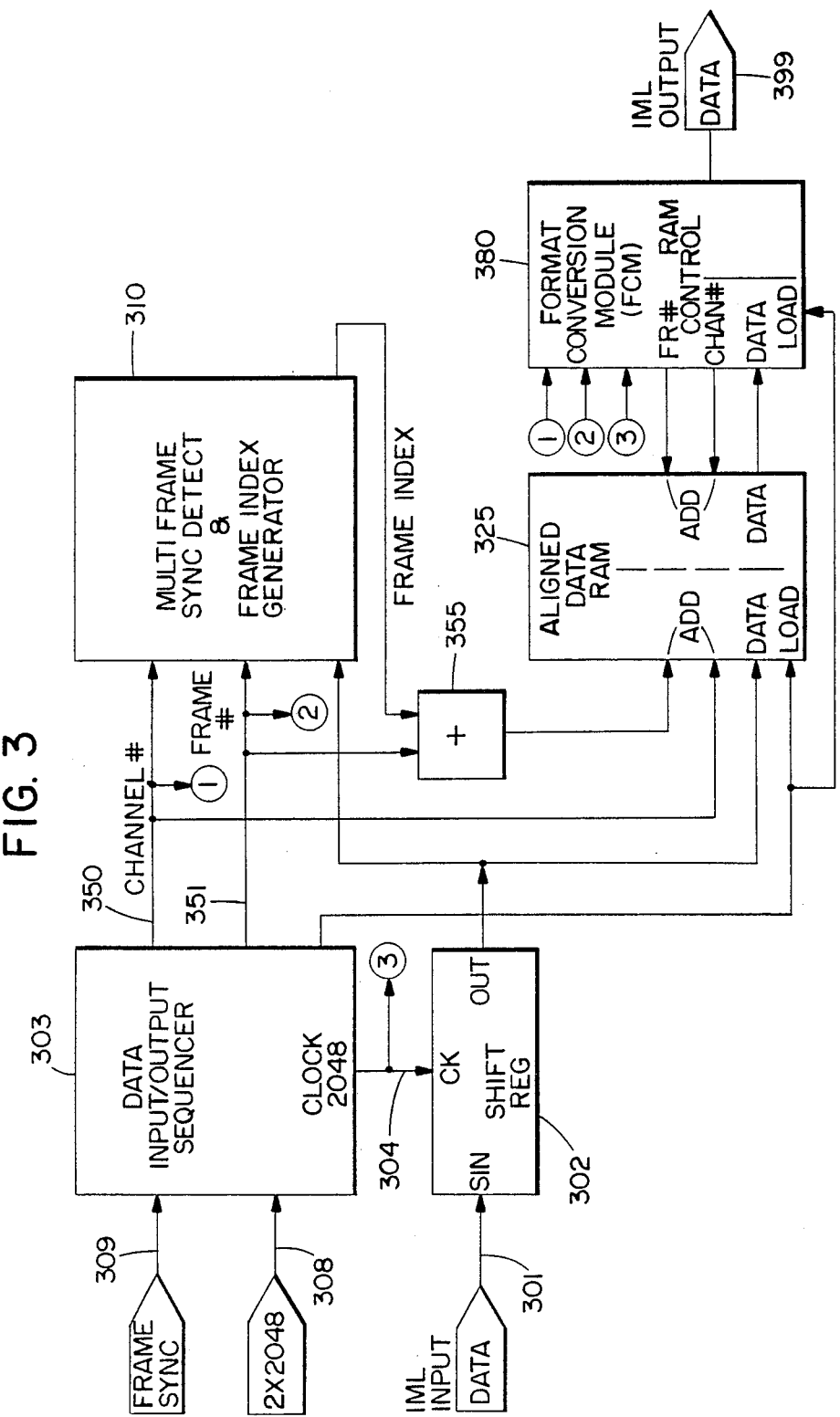
FIG. 3 is a functional block diagram of the Format Converter (FC) that operates in accordance with the teachings of the invention.

FIG. 3 is a functional block diagram of a Format Converter (FC), shown in FIG. 2 as format converter 180, that operates in accordance with the teaching of the invention.

Before detailing the operation of the depicted FC, two specific CCITT formats will be described along with the general functional requirements of the FC that is capable of converting between these two formats. This description will lay a foundation for describing the more general invention functionally depicted in FIG. 3, but is not meant to limit the invention to methods and apparatus for converting only between the illustrative formats.

The FC used to teach the invention is a TDM X.50/ISDN (bidirectional) Format Converter suitable for use as part of a digital communication system. For the sake of illustration only, one part of the system is defined to use the CCITT I.463 ISDN sub-rate data format for its internal data communication; while another part of the system uses the X.50 convention. The FC allows non-ISDN compatible equipment (such as X.50 compatible equipment) to be coupled to the I.463 oriented part of the system.

The details of the sub-rate formats operated on by the FC that is used herein to teach the invention, will be reviewed first for the sake of completeness before describing the details of the format converter structure per se.

The TDM sub-rate data format referred to hereinabove conforms to the CCITT recommendations X.50. Again, this sub-rate format is used, for example, by the Japanese in their Super Digital Type II link.

In a preferred embodiment of the invention, the FC is designed to have a 480 circuit capacity since a Super Digital Type II interface can handle 480 2.4 Kbps circuits. As a result, in one application of the invention, one format converter is capable of servicing one Super Digital Type II interface. Circuit capacity vs. sub-rate data format is discussed more fully hereinafter.

For the sake of illustration only, the invention will be set forth in the context of a switching system where the basic sub-rate circuit is 2.4 Kbps. The illustrative sub-rates will be 2.4, 4.8, 9.6, and 19.2 Kbps. In addition to these sub-rate circuits, the invention handles 48 and 56 Kbps circuits. These circuits are confined to one 64 Kbps information channel and do not span multiple 64 Kbps channels. This is because synchronization between channels can not be guaranteed. Both ISDN and TDM links carry circuits above 19.2 Kbps. At these rates, only one circuit occupies the 64 Kbps channel, and the sub-rate structure is not used. The preferred FC will pass these higher rate circuits with the proper signal and framing bits required of each format.

The sub-rate formats for the illustrative embodiment of the invention will now be described.

Figure 4:
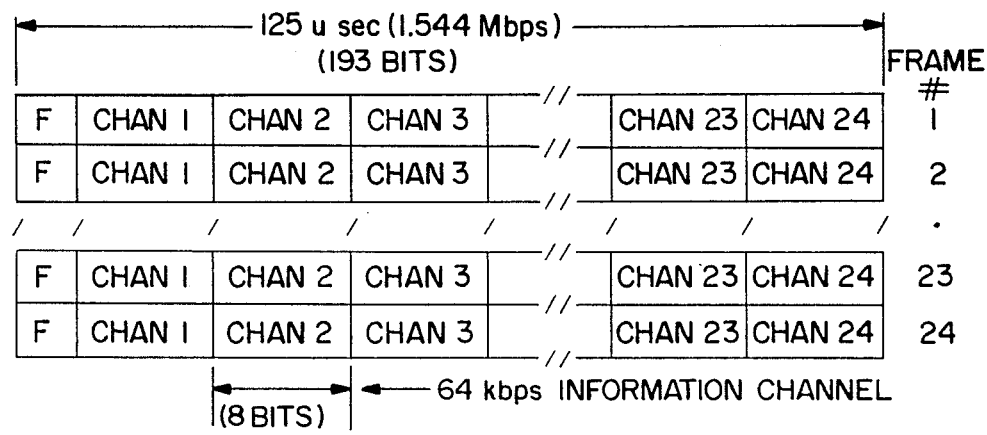
FIG. 4 depicts the frame and multiframe structure of an SD Type II data link.

Super Digital ("SD") is a term used to describe the Japanese Type II data link. The SD Type II structure is very similar to the U.S. T1 link. The bit rate is 1.544 MHz. Each frame is 125 microseconds wide and is composed of 193 bits. The first bit is for link overhead, and the remaining 192 bits are organized into 24 channels of eight bits each. Each channel is a 64 Kbps information channel. The frames are grouped into multiframes of 24 frames each. The first frame in the multiframe is indicated by a coding violation in the link overhead bit. The frame and multiframe structure of the SD Type II link is shown in FIG. 4.

Figure 5:
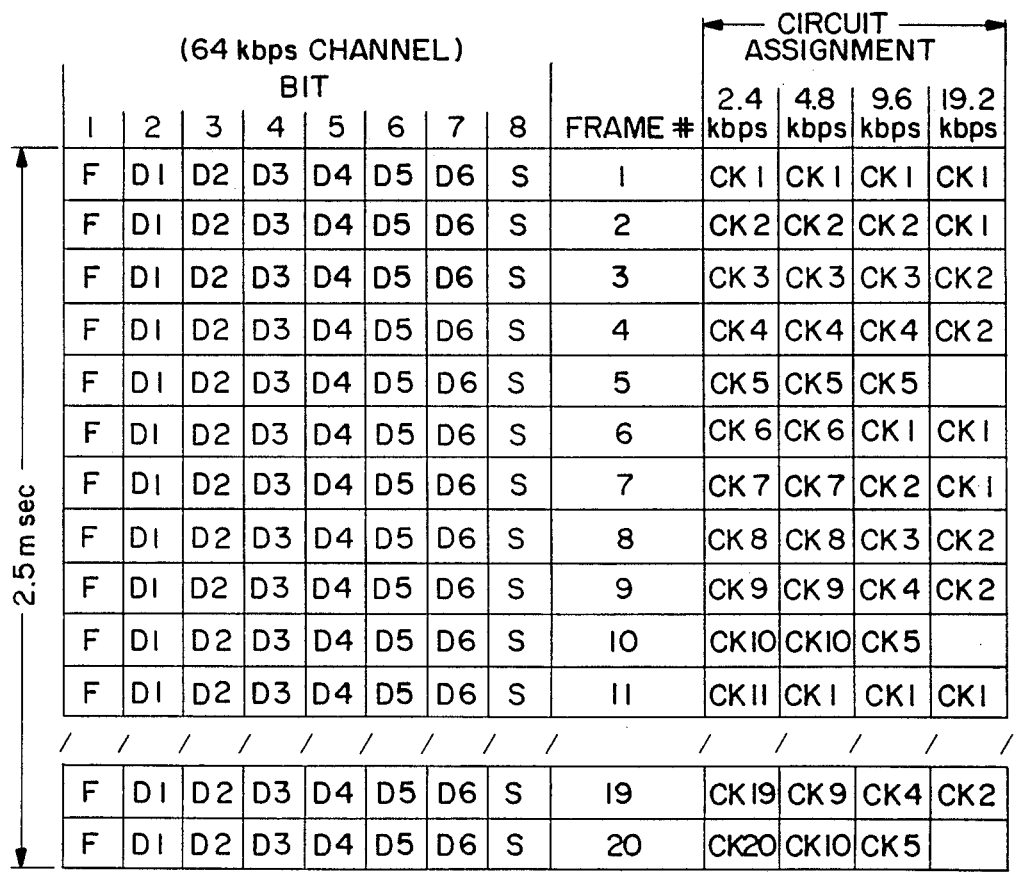
FIG. 5 depicts the TDM sub-rate multiframe structure for one 64 Kbps channel.

The TDM sub-rate format embeds twenty 3.2 Kbps circuits within a 64 Kbps TDM channel per CCITT Recommmendation X.50. The TDM Type II link can contain up to twenty-four multiframes. The multiframe is not synchronized to the starting frame of the TDM links. As a result, framing information must be embedded in the multiframe itself. One of the eight bits in the 64 Kbps channel is reserved for a framing bit. FIG. 5 shows the TDM sub-rate multiframe structure for one 64 Kbps channel.

Each sub-rate frame contains the following bits:
(a) F=frame synchronization bit (X.50 pattern)
(b) S=state bit (1=data valid, 0=data not valid)
(c) D=6 bit circuit data Each 2.4 Kbps circuit occurs every 20 frame periods or 2.5 m sec. The data rate for each frame is 3.2 Kbps (8 bits/2.5 m sec). The information rate for the circuit data (6 bits) is 2.4 Kbps (6 bits/2.5 m sec).

The "F" bits are used to deframe the multiframe circuit data. The FC will ignore the "S" bit information. The "S" bits will be set to a default value of "1" in outgoing TDM data. The "D" bits are the circuit data, which need to be reformatted.

Figures 6, 7:
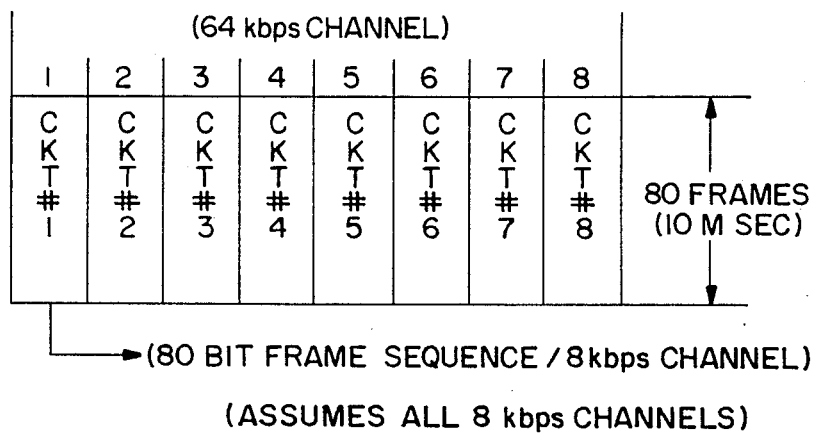
FIG. 6 depicts the configuration of a frame alignment word associated with a given multiframe.
FIG. 7 depicts the ISDN sub-rate structure of one 64 Kbps channel.

The multiframe has a 20-bit frame alignment word embedded in it. The "F" bit of the sub-rate data is used to form this word. The frame alignment word (FAW) is configured as shown in FIG. 6.

According to X.50 format, the first bit of the FAW is an alarm bit. An alarm condition occurs when there is an absence of incoming pulses, or a loss of frame alignment. The FC will detect an alarm condition and note its multiframe channel number. This information can be passed onto, for example, a node processor in the switching system. Outgoing "A" bits can be set to either alarm or no alarm condition. The "F" bit will always occur in bit location 1 of the sub-rate multiframe. However, each multiframe in a TDM multiframe is aligned independently of any other multiframe in the link. Alignment of one multiframe does not guarantee alignment of any of the other 23 multiframes. Deframing data in a TDM multiframe must be done on an individual multiframe basis.

It should be noted that since the basic sub-rate circuit is 2.4 Kbps and a sub-rate multiframe will contain twenty 2.4 Kbps circuits, higher circuit rates can be obtained by combining multiple 2.4 Kbps cirucits to form a high information rate circuit. The following rates are available using this technique:

| Circuit Rate | Circuits/Multiframe |
| --- | --- |
| 2.4 Kbps | 20 |
| 4.8 Kbps | 10 |
| 9.6 Kbps | 5 |
| 19.2 Kbps | 2 |
| 48.0 Kbps | 1 |
| 56.0 Kbps | 1 |
| 64.0 Kbps | 1 |

Again, this technique is restricted to one 64 Kbps channel, since there is no method to insure synchronization between multiple 64 Kbps channels.

Having reviewed the Japanese TDM sub-rate format, the ISDN format will now be described.

The ISDN sub-rate splits one 64 Kbps channel into a maximum of eight 8 Kbps channels. The ISDN sub-rate structure of one 64 Kbps channel is shown in FIG. 7. The basic ISDN granularity is 8 Kbps.

Each channel carries one circuit. The circuit information is arranged into an 80-bit frame squence. The frame sequence contains framing information, circuit rate information, and signalling information, as well as the circuit data. Unlike the TDM multiframe sub-rate structure, there is no embedded frame structure required to break out individual circuits. The 80-bit frame structure for one channel is depicted in FIG. 8.

The FC will ignore incoming "S", "X" and "E" bits. Outgoing "S" and "X" bits are set to default values of "1". The "E" bits are set to the proper circuit rate value.

The ISDN sub-rate data is transmitted as an 80-bit serial data stream, starting with Octet 0-bit 0 and ending with Octet 9-bit 8. The "0" and "1"s form a framing structure as shown in FIG. 9.

Figures 8, 9:
FIG. 8 depicts the 80-bit frame structure for one channel ISDN channel.
FIG. 9 depicts the "0"s and "1"s forming the framing structure in the ISDN context.

The basic 80 bit frame structure, shown in FIG. 8, can support several circut sub-rates. The maximum sub-rate for an 8 Kbps channel using this frame structure is 4.8 Kbps (48 bits/10 m sec). Slower circuit rates are implemented by repeating circuit data among the "D" bits. For example, a 2.4 Kbps circuit will use all 48 "D" bits, but will repeat data for every 2 "D" bits, giving an effective "D" bit number of 24 data bits per frame (2.4 kbps=24 bits/10 m sec). Conversely, higher circuits rates can be obtained by combining multiple 8 Kbps channels. The sub-rates become multiples of 4.8 Kbps. The following rates are available using this technique.

| Circuit Rate | Circuits/64 Kbps Channel |
|---|---|
| 2.4 Kbps | 8 (8 Kbps channel) |
| 4.8 Kbps | 8 (8 Kbps channel) |
| 9.6 Kbps | 4 (16 Kbps channel) |
| 19.2 Kbps | 2 (32 Kbps channel) |
| 48.0 Kbps | 1 (64 Kbps channel) |
| 56.0 Kbps | 1 (64 Kbps channel) |
| 64.0 Kbps | 1 (64 Kbps channel) |

A serious problem exists between the ISDN and TDM subrate formats: circuit capacity per 64 Kbps channel. The circuit capacity of both sub-rate formats is repeated here:

| Circuit Rate | Circuits/64 kbps Channel | | |
|---|---|---|---|
| | SD | ISDN | |
| 2.4 Kbps | 20 | 8 | |
| 4.8 Kbps | 10 | 8 | TDM greater than ISDN |
| 9.6 Kbps | 5 | 4 | |
| 19.2 Kbps | 2 | 2 | |
| 48.0 Kbps | 1 | 1 | TDM equal to ISDN |
| 56.0 Kbps | 1 | 1 | |
| 64.0 Kbps | 1 | 1 | |

For low rate circuits (9.6 Kbps and below) the TDM subrate format has greater circuit capacity than ISDN. Extra ISDN channels are required to equal the circuit capacity of the TDM channels. As a practical matter, extra channels may not be available. As a result, the preferred FC and conversion process contemplates a worst case situation and limit their performance to the capacity of the ISDN sub-rate format.

Having reviewed an illustrative context in which the invention is to operate, the format converter itself will now be described with reference to FIG. 3.

For the sake of illustrating the invention, it will be assumed that an IML stream, with embedded X.50 formated sub-rate circuit data, is input to the format converter on link 301. This is shown coming from the switch matrix as shown in FIG. 2.

All of the teachings to be set forth hereinafter support an FC with a bidirectional operating capability, i.e., for the example of an X.50/I.463 converter, I.463 formatted sub-rate data could just as well be embedded in the input IML stream The difference would be the structure of the bit map driving the conversion process and in the synchronization detection process, to be explained in detail hereinafter with reference to FIG. 12.

The invention contemplates a programmable bit map to support conversion between a plurality of format protocols.

The data input on link 301 is shown clocked into shift register 302, via a 2048 Khz clock signal output by data input/output sequencer 303 on link 304.

Data input/output sequencer 303 is shown receiving a frame synchronization signal and 4096 Khz clock input signal from an external synchronization and control device (not shown in FIG. 3). The synchronization and control device is nothing more than a timer which sends a framing signal and 4096 Mhz clock signal to device 303.

The function of device 303 is to provide basic timing and control for the TDM and ISDN data input/output. Unit 303 is shown to accept the two 2048 Khz clock signals and a frame synchronization signal from an external timing unit. These signals are depicted as being input to unit 303 on links 308 and 309 respectively. Unit 303 generates a properly phased 2048 Khz clock signal for control of the input IML channel (via link 304), a data strobe (load) on link 315, and a current address value (shown as channel number and frame number in FIG. 3 on links 350 and 351 respectively) which is used to segregate data into the proper channel frame and bit location postitions for storage in aligned data memory 325. This procedure will be explained in greater detail hereinafer.

The conversion process itself consists of two steps: (a) storing the incoming TDM multiframe data from the IML input into the aligned data memory (preferably a RAM); and (b) conversion of TDM data to ISDN data, based on a bit mapping conversion scheme.

The input TDM data is written directly into the aligned data RAM using an address offset (or indexing) scheme. FIG. 3 and 5 illustrate this process.

The objective of this process is to store all the incoming data into the aligned memory where all the multiframes (for TDM data) are organized as shown in FIG. 5 (i.e., circuit number one is located in frame number one, circuit number two in frame number two, etc.). This process is necessary since the incoming TDM multiframes are not aligned to each other. Since the format conversion process uses a bit mapping scheme, it is important to store the TDM data into known locations for this process to work.

A parallel processing circuit, shown in FIG. 3 as Sync Detect and Frame Index Generator 310, examines the multiframe data for the starting postions of each of the 31 TDM multiframes. The starting position is identified as the "Frame Index". The "Frame Index" is generated, according to one embodiment of the invention, when the framing word for a TDM multiframe has been detected at least three times in a row at the same frame location. The "Frame Index" is an address offset value which when added to the Current Address value (shown at block 355 of FIG. 3) will place the TDM multiframe data into the correct location of the Aligned Data Memory.

Figure 10:
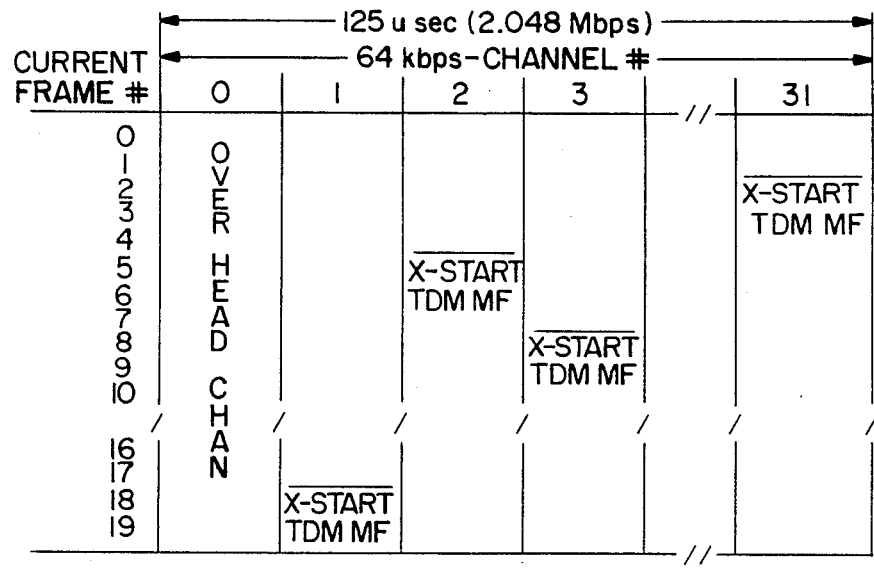
FIG. 10 depicts the TDM data alignment process supported by the illustrative embodiment of the invention.

The Frame Index value is added to the Current Address value to form the Align Frame value. FIG. 10 illustrates this process. The Initial TDM multiframe placement is offset by the Frame Index value to create the Aligned TDM multiframe data.

It will be recognized by those skilled in the art that each of blocks 302, 303, 310, 325 and 355 of FIG. 3 can be realized by either conventional off-the-shelf logic or well known methods and apparatus for performing synchronization and framing. Units 302 and 355 can be realized by a standard 8 bit shift register, and an adder, respectively. Unit 303 can be realized by a counter chain controlled by the external frame synchronization and clock signals. Unit 350 can be a RAM and unit 310 can be realized by well known methods and apparatus for synchronizing an asynchronous serial bit stream that inherently contains framing information.

Once the incoming data is stored in the aligned data memory the illustrative TDM to ISDN conversion can be accomplished using the bit map and a readout sequencer to output data in the ISDN format. This is depicted in FIG. 3 as taking place in the format conversion module (FCM), unit 380, and is described in detail hereinafter with reference to FIG. 11.

Figure 11:
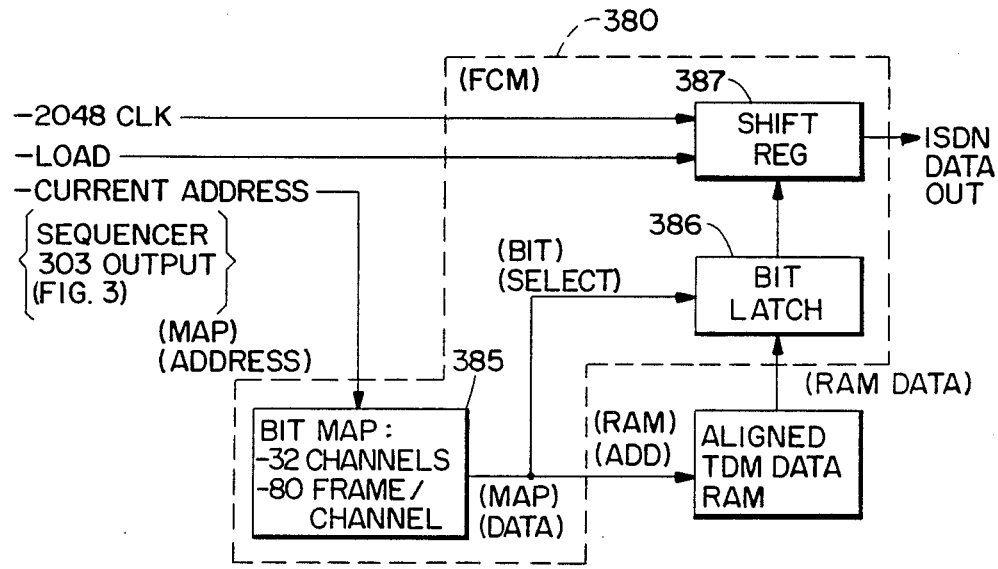
FIG. 11 depicts, in block diagram format, one example of a Format Conversion Module (FCM) suitable for use in implementing the present invention.

According to the preferred embodiment of the invention the output data is formatted a byte at a time. The bit map contains a 80 frame mapping sequence, which conforms to the ISDN format. The proper circuit data placement, as well as the framing bits ("0", "1"), the "S" and "X" bits (defaulted to "1"), and the proper "E" bit information, are also contained in the map. FIG. 11 depicts this process in simple block diagram form.

FIG. 11 shows an example of the FCM where, in accordance with one embodiment of the invention, the bit map (unit 385), a bit latch (unit 386) and a shift register (unit 387) are all within the FCM. Those skilled in the art will recognize that, for example, units 386 and 387 could be located outside the FCM without departing from the spirit and scope of the invention.

The bit map contained in the FCM is driven by the current address value output by unit 303 as shown in FIG. 3.

Based on the current address input to the FCM, the bit map knows what the next outgoing ISDN data byte should be comprised of. The bit map loads up the next outgoing ISDN data byte into the bit latch. The proper circuit data bits are picked from the aligned data RAM and stored into the proper byte position in the bit latch. The load strobe from unit 303 will load this valued into the shift register at the appropriate time and the data will be clocked onto the IML bus (shown in FIG. 3 at 399).

Bit maps for each sub-rate conversion circuit can be, for example, stored in ROM. Templates can be constructed to suit any protocol involved in the conversion process. The bit map are programmable presenting to the user a very high degree of flexibility in designing format conversion options.

The preferred embodiment of the FC performs conversion in the ISDN to TDM direction as well. This process is generally the same as described hereinabove for the TDM to ISDN direction but detailed differences lie in the synchronization detection process and bit map structure, as will be explained hereinafter with reference to FIG. 12.

The ISDN data is written directly into an Aligned Data RAM using an address offset (or indexing) scheme. FIG. 12 illustrates this process. The objective of this process is to store all the incoming ISDN data into the depicted Aligned Data Ram, 1205, where all the ISDN circuit data is placed into known locations, (i.e., Circuit #1—Data Bit #0 is placed into Aligned RAM 1205, location #0—Bit #0). This process is necessary since the incoming ISDN circuits are not aligned to each other. Since the format conversion process uses a bit mapping scheme, it is important to store the ISDN data into known locations for this process to work.

A parallel processing circuit, referred to hereinafter as ISDN Circuit Detect and Index Generator 1206, examines the ISDN circuit data for the starting positions of each of the 256 possible ISDN circuits. The starting position is identified as the "Circuit Index". The "Circuit Index" is generated, according to the preferred embodiment of the invention, when the framing structure for an ISDN circuit has been detected at least three times in a row at the same location. The "Circuit Index" is an address offset value which when added to the Current Address value will place the TDM multiframe data into the correct location of the Aligned Data RAM.

Figure 12:
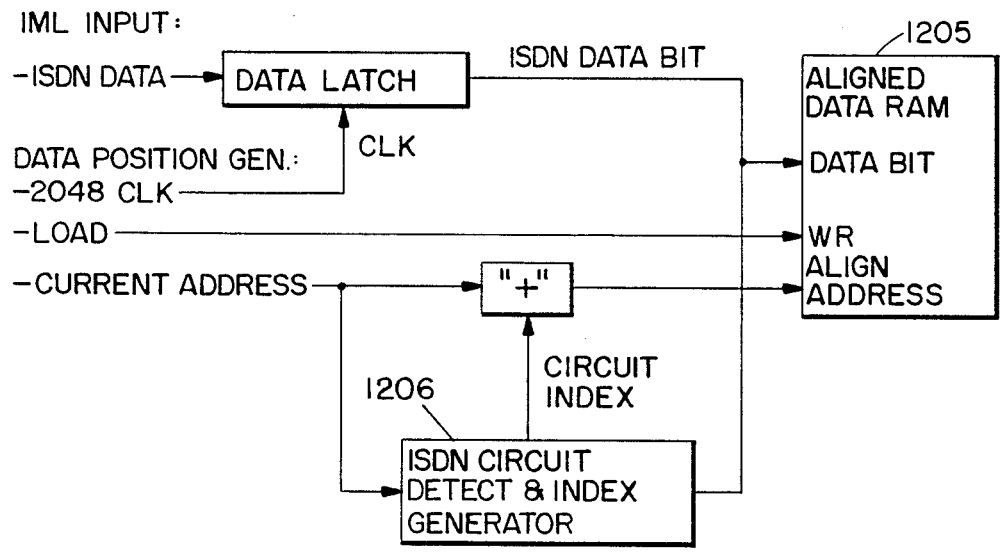
FIG. 12 depicts, in block diagram form, the ISDN data alignment portion of the illustrative TDM/ISDN format converter.

FIG. 12 is a simple block diagram of the ISDN Data Alignment portion of the ISDN to TDM conversion circuit. Again, as with FIG. 3, the components and frame detection methodology depicted in FIG. 12 are well known to those skilled in the art.

The actual ISDN to TDM conversion is accomplished using a bit map and a readout sequencer to output data in the TDM format. The output data is formatted a byte at a time. The bit map contains an 80-frame mapping sequence, which conforms to the TDM format. The proper mapping sequence, which conforms to the TDM format. The proper circuit data placement, as well as the framing bits ("0"), "1") and the "S" bits (defaulted to "1") are also contained in the map.

Figure 13:
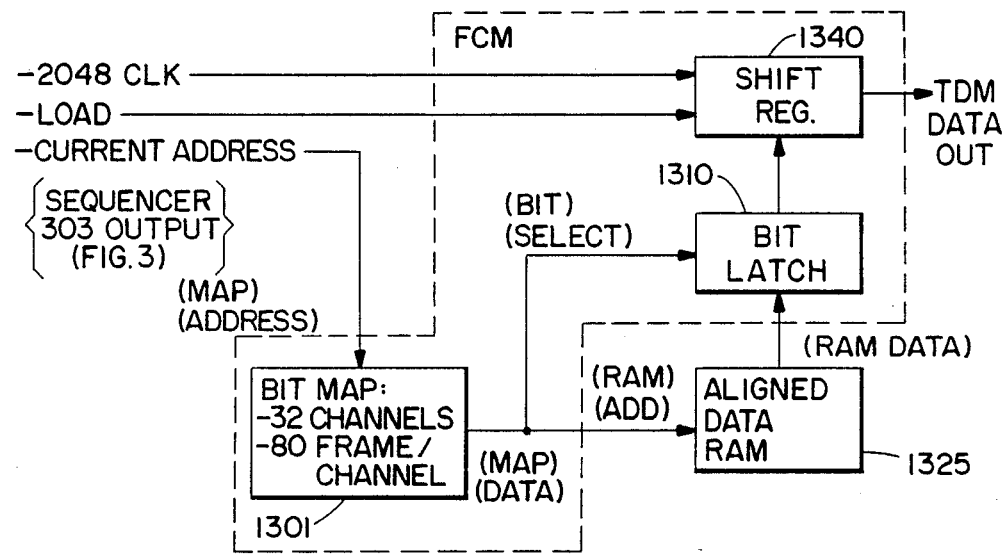
FIG. 13 depicts, in block diagram form, the ISDN to TDM conversion process utilizing the invention.

FIG. 13 is a simple block diagram of this process. Bit map 1301, is driven by the Current Address value from the data input/output sequences (e.g. unit 303 of FIG. 3). Based on this input, the bit map knows what the next outgoing TDM data byte should be comprised of. Bit map 1301 loads the next outgoing TDM data byte into Bit Latch 1310. The proper circuit data bits are picked from Aligned Data RAM 1325 and stored into the proper byte position in Bit Latch 1310. The LOAD strobe from sequencer 303 will load this value into Shift Register 1340 at the appropriate time and the data will be clocked onto the IML bus.

Again bit map templates for each sub-rate circuit conversion can be stored, for example, in ROM.

To conclude this detailed description of the invention, since the format conversion process is dependent upon the use of bit mapping techniques, an explanation of the bit mapping format conversion process will be set forth hereinafter for the sake of completeness.

Bit map operation is explained hereinafter by way of example. This example considers only one 64 Kbps channel. The format conversion will transform TDM into ISDN sub-rate data. FIG. 14 illustrates the first 20 frames of stored TDM data in the Algined Data RAM and the first 20 frames of the outgoing ISDN data.

Figures 15, 16:
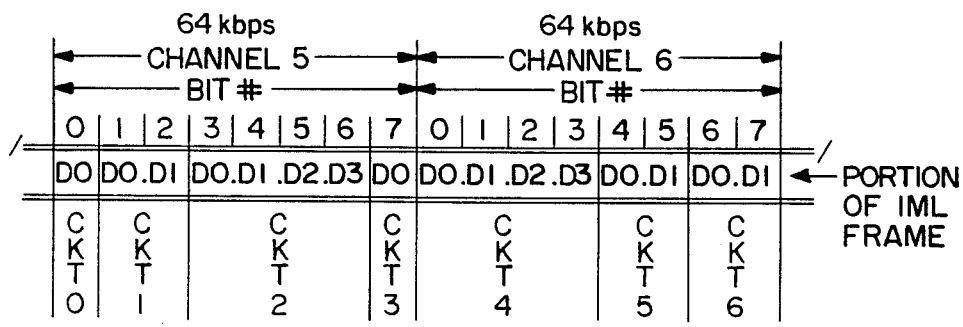
FIG. 15 depicts aligned data RAM address segments.
FIG. 16 depicts an example of ISDN circuit assignments within an IML frame.

The TDM data, which resides in the Aligned Data RAM, was stored into RAM according to its position in the IML frame. The Aligned Data RAM address is segmented using IML position data as shown in FIG. 15.

The ISDN data, shown in FIG. 14 is arranged by its postion in the outgoing IML frame. Channel, Frame and Bit # are determined by the Current Address. The data for ISDN circuits 1-8 reside in the TDM Aligned Data RAM (frames 0-7). This information must be retrieved from the Aligned Data RAM at the proper time.

As an example, assume the Current Address=Channel 1, Frame 12. Referring to FIG. 14, one can see that the outgoing ISDN data byte at this Current Address location is composed of TDM circuits 1 through 8, bit D2. Referring again to FIG. 14, the data for the eight TDM circuits can be seen to reside in the Aligned Data RAM at frame locations 0-7, bit location 2. A lookup table can be generated for Current Address vs. Aligned Data RAM Address. For this example the table is:

| Circuit # | Bit # | Current Address | | | Aligned Data RAM Address | | |
|---|---|---|---|---|---|---|---|
| | | Channel | Frame | Bit | Channel | Frame | Bit |
| 1 | D2 | 1 | 12 | 0 | 1 | 0 | 2 |
| 2 | D2 | 1 | 12 | 1 | 1 | 1 | 2 |
| 3 | D2 | 1 | 12 | 2 | 1 | 2 | 2 |
| 4 | D2 | 1 | 12 | 3 | 1 | 3 | 2 |
| 5 | D2 | 1 | 12 | 4 | 1 | 4 | 2 |
| 6 | D2 | 1 | 12 | 5 | 1 | 5 | 2 |
| 7 | D2 | 1 | 12 | 6 | 1 | 6 | 2 |
| 8 | D2 | 1 | 12 | 7 | 1 | 7 | 2 |

This table is the basis for the bit map. Let:

a. BIT MAP ADDRESS=CURRENT ADDRESS
b. BIT MAP DATA=ALIGNED DATA RAM ADDRESS

The Bit Map becomes a lookup table of Current Address vs. Aligned Data RAM Address. When the Bit Map is presented with a Current Address, it will produce the corresponding Aligned Data RAM Address needed to retrieve data from the Aligned Data RAM.

The Bit Map address and data words are segmented according to the channel, frame and bit values. An example is given here:

| BIT MAP ADDRESS: | [—Current Address—] | | |
|---|---|---|---|
| | Channel # | Frame # | Bit # |
| ADDRESS = | A12 A11 A10 A9 A8 | A7 A6 A5 A4 | A3 A2 A1 A0 |
| BIT MAP DATA: | [—Aligned Data RAM Address—] | | |
| | Channel # | Frame # | Bit #7 |
| DATA = | A12 A11 A10 A9 A8 | A7 A6 A5 A4 | A3 A2 A1 A0 |

Using this manner of Bit Map Address and data word assignments the lookup table generated for Current Address vs. Aligned Data RAM Address is stored in the Bit Map as follows:

| Circuit # | Bit # | BIT MAP ADDRESS DATA (hex) |
|---|---|---|
| 1 | D2 | 0160 0103 |
| 2 | D2 | 0161 010B |
| 3 | D2 | 0162 0113 |
| 4 | D2 | 0163 011B |
| 5 | D2 | 0164 0123 |
| 6 | D2 | 0165 012B |
| 7 | D2 | 0166 0133 |
| 8 | D2 | 0167 013B |

The Bit Map provides the cross-connection between TDM and ISDN circuits. The connection plan function is inherent in the Bit Map operation since the Bit Map can place incoming circuit data anywhere in the outgoing IML data stream.

TDM circuits are defined by IML channel assignment and circuit sub-rate. The circuit sub-rate information defines where the circuit data resides within a TDM multiframe as illustrated in FIG. 14.

ISDN circuits are defined by IML postion and circuit sub-rate. Unlike TDM circuits, each ISDN circuit resides within a 8 Kbps (or multiple 8 Kbps) channel. Circuits of difference sub-rates are allowed to coexist within one 64 Kbps channel As a result the IML position must include channel position AND position within the channel (bit location).

An example of ISDN circuit assignments is shown in FIG. 16.

Once the TDM and ISDN circuit locations are established, the connection between the two must be established (i.e., TDM Ckt #23=ISDN Cirucit #210). This information can be sent to the FC from the network processor. According to the illustrated embodiment of the invention, three rules for the connection plan are:

a. TDM data collected into one 64 Kbps channel MUST be of the same circuit subrate.
b. ISDN data which is of multiple 8 Kbps channels MUST reside within the same 64 Kbps channel and occupy consecutive 8 Kbps channels.
c. TDM and ISDN circuits which are connected must be of the same circuit sub-rate.

The actual Bit Map provides both circuit cross connect and format conversion. The Bit Map is, according to the invention, loaded with the proper circuit sub-rate conversion templates according to the arrangement of the outgoing circuit sub-rate characteristics. An example of a circuit sub-rate conversion template is given in FIG. 14. It provides the basic format conversion plan between TDM and ISDN sub-rates for one circuit sub-rate.

What has been described herein is a Format Converter that supports TDM/ISDN format conversion.

The converter described is bidirectional. Those skilled in the art will recognize that the FC is programmable, i.e. modifying the templates will yield different format conversion results.

Those skilled in the art will also recognize that:
(a) the invention supports bidirectional conversion between a single stage time division multiplexed data format and a two stage time division multiplexed format, and more generally that
(b) the invention supports conversion between first and second predetermined protocols for embedding sub-rate circuit data in a high speed serial bit stream.

All of the aforestated objectives of the invention are met by the methods and apparatus described hereinabove. Those skilled in the art will recognize that the foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. Apparatus, for use in a digital communication system that carries data in a plurality of sub-rate data formats, for converting a first serial bit stream, with data embedded therein in accordance with a first predefined sub-rate data format, into a second bit stream, with data embedded therein in accordance with a second predefined sub-rate data format, comprising:
   (a) means for locating and extracting the sub-rate data, formatted in accordance with said first predefined sub-rate data format, embedded in said first serial bit stream;
   (b) means, coupled to said means for locating and extracting, for aligning and storing said extracted data; and (c) conversion means, coupled to said means for aligning and storing, for construction said second serial bit stream from the stored extracted data utilizing a bit map designed to organize said second serial bit stream in accordance with said second predefined sub-rate data format.

2. Apparatus as set forth in claim 1 which may be used to convert between data formatted in a single stage time division multiplexed format and data formatted in a two stage time division multiplexed format.

3. Apparatus as set forth in claim 1 which may be used to convert sub-rate circuit data embedded in said first serial bit stream, formatted in accordance with CCITT X.50 recommendations, to a serial bit stream containing sub-rate circuit data formatted in accordance with CCITT I.463 recommendations.

4. Apparatus as set forth in claim 1 which may be used to convert sub-rate circuit data embedded in said first serial bit stream, formatted in accordance with CCITT I.463 recommendations, to a serial bit stream containing sub-rate circuit data formatted in accordance with CCITT X.50 recommendations.

5. Apparatus as set forth in claim 1 wherein multiple channels of different formats can be aligned and converted simultaneously.

6. Apparatus as set forth in claim 1 wherein said means for locating and extracting further comprises frame synchronization detection means.

7. Apparatus as set forth in claim 6 wherein said means for locating and extracting further comprises frame index generator means.

8. Apparatus as set forth in claim 6 wherein said means for locating and extracting further comprises circuit index generator means.

9. Apparatus as set forth in claim 1 wherein said conversion means is programmable.

10. Apparatus, in a digital communication system including a timer for providing frame synchronization and clock signals, for converting a first serial bit stream, with sub-rate circuit data formatted according to a first predetermined protocol embedded therein, into a second serial bit stream, with said sub-rate circuit data formatted in accordance with a second predetermined protocol embedded therein, comprising:

(a) means, coupled to said timer, for generating a current address signal to indicate channel and frame number for the information being input by way of said first serial bit stream;

(b) synchronization and index generation means, for detecting the starting postion of frames and multiframes in order to create an address offset into an aligned data memory used to collect and store sub-rate circuit information;

(c) aligned data memory means coupled to said synchronization and index generator means, for aligning and storing sub-rate circuit data therein;

(d) format conversion module means, including a predefined bit map driven by the aforesaid channel and frame number, for assembling a frame of reformatted sub-rate circuit information, reformatted according to said second predefined protocol, and for embedding said frame of reformatted information in said second bit stream; and (e) means for outputting said second serial bit stream with the reformatted sub-rate circuit data embedded therein.

11. Apparatus as set forth in claim 10 wherein said synchronization and index generator means includes means for generating a frame index.

12. Apparatus as set forth in claim 10 wherein said synchronization and index generator means includes means for generating a circuit index.

13. Apparatus as set forth in claim 10 wherein said format conversion module is programmable.

14. A method, for use in a digital communication system that carries data in a plurality of sub-rate data formats, for converting a first serial bit stream, with data embedded therein in accordance with a first predefined sub-rate data format, into a second bit stream, with data embedded therein in accordance with a second predefined sub-rate data format, comprising the steps of:

(a) locating the sub-rate data formatted in accordance with said predefined sub-rate data format, embedded in said first serial bit stream;

(b) extracting the formatted sub-rate data so located and storing same in an aligned fashion in a storage means; and (c) constructing said serial bit stream from the stored aligned data utilizing a bit map designed to organize said second serial bit stream in accordance with said second predefined sub-rate data format.

* * * * *